United States Patent [19]
Menezes et al.

[11] Patent Number: 5,847,802
[45] Date of Patent: *Dec. 8, 1998

[54] CONCENTRIC ANNULAR RING LENS DESIGNS FOR ASTIGMATIC PRESBYOPES

[75] Inventors: Edgar V. Menezes; Jeffrey H. Roffman, both of Jacksonville, Fla.

[73] Assignee: Johnson & Johnson Vision Products, Inc., Jacksonville, Fla.

[*] Notice: The term of this patent shall not extend beyond the expiration date of Pat. No. 5,652,638.

[21] Appl. No.: 892,466

[22] Filed: Jul. 14, 1997

Related U.S. Application Data

[63] Continuation of Ser. No. 433,844, May 4, 1995, abandoned.

[51] Int. Cl.$^6$ ........................................... G02C 7/04
[52] U.S. Cl. ........................... 351/161; 351/176; 351/177; 623/6
[58] Field of Search ................... 351/161, 168, 351/169, 171, 176, 177; 623/6

[56] References Cited

U.S. PATENT DOCUMENTS

| | | | |
|---|---|---|---|
| 4,324,461 | 4/1982 | Salvatori | 351/160 H |
| 4,580,882 | 4/1986 | Nuchman et al. | 351/161 |
| 4,932,970 | 6/1990 | Portney | 623/6 |
| 5,050,981 | 9/1991 | Roffman | 351/177 |
| 5,056,908 | 10/1991 | Cohen | 351/161 |
| 5,100,226 | 3/1992 | Freeman | 351/160 R |
| 5,652,638 | 7/1997 | Roffman et al. | 351/161 |

*Primary Examiner*—Georgia Epps
*Assistant Examiner*—Jordan M. Schwartz
*Attorney, Agent, or Firm*—Anne B. Kiernan

[57] ABSTRACT

Concentric lens designs are disclosed for astigmatic presbyopes which comprise at least one surface which has a circular central portion and a plurality of concentric annular rings with at least three separate optical powers corresponding to a prescription for a patient and corresponding to 1) a basic distance spherical prescription Rx, 2) a near add spherical prescription Rx, and 3) a spherical prescription corresponding to the full, or preferably a fraction of the, cylindrical prescription Rx. An astigmatic presbyopic prescription contains an astigmatic correction, normally in the nature of a cylindrical prescription which specifies both the cylindrical optical power and the orientation of the cylindrical axis. The cylindrical prescription is taken into account in the design of the lens, but not with a cylindrical optical surface. Instead, the present invention recognizes that the brain can effectively discriminate between separate competing images by accepting an in-focus image and rejecting an out-of-focus image. Accordingly, a portion of the lens is provided with a spherical surface corresponding to the cylindrical prescription, or more preferably a fraction of the full cylindrical prescription, and the brain is relied upon to discriminate and accept an in-focus image to compensate for the patient's astigmatism.

20 Claims, 1 Drawing Sheet

S = SPHERICAL DISTANCE Rx POWER
N = NEAR POWER
C = CYLINDRICAL POWER

S = SPHERICAL DISTANCE Rx POWER

N = NEAR POWER

C = CYLINDRICAL POWER

CONCENTRIC ANNULAR RING LENS DESIGNS FOR ASTIGMATIC PRESBYOPES

This is a continuation of application Ser. No. 08/433,844, filed May 4, 1995, now abandoned.

BACKGROUND OF THE INVENTION

1. Field of the Invention

The present invention relates generally to concentric annular ring lens designs for astigmatic presbyopes. More particularly, the subject invention pertains to such concentric annular ring lens designs wherein at least one surface of the lens has a circular central portion and a plurality of annular rings with at least three separate spherical optical powers corresponding to a prescription for the astigmatic presbyopic patient. The three separate spherical optical powers correspond to 1) a basic distance spherical prescription Rx, 2) a near add spherical prescription Rx, and 3) a spherical prescription corresponding to the full, or preferably a fraction of the, cylindrical prescription Rx.

2. Discussion of the Prior Art

The present invention pertains to ophthalmic lenses, and in particular to contact lenses such as soft hydrogel contact lenses, and intraocular lenses, designed particularly for astigmatic presbyopes.

It is well known that as an individual ages, the eye is less able to accommodate, i.e. bend the natural lens in the eye, in order to focus on objects that are relatively near to the observer. This condition is referred to as presbyopia, and presbyopes have in the past relied upon spectacles or other lenses having a number of different regions with different optical powers to which the wearer can shift his vision in order to find the appropriate optical power for the object or objects upon which the observer wishes to focus.

Similarly, for a person who has had the natural lens of the eye removed because of a cataract condition and an intraocular lens inserted as a replacement, the ability to adjust the lens (accommodate) to the distance of the object being viewed is totally absent. In this case, the lens provided is usually set at a single infinite distance focal power, and spectacles are worn to provide the additional positive optical power needed for in-focus closer vision. For such a patient, a functional multifocal lens would be particularly useful.

It is known that for astigmatic subjects, the astigmatic eye forms an image which contains three main regions:

1. The spherical power focuses as a line;
2. The cylindrical power also focuses as a line, perpendicular to the spherical image line;
3. In between the two, a circular image is formed, known as the "circle of least confusion."

It is also known in the art that under certain circumstances the brain can effectively discriminate between separate competing images by accepting an in-focus image and rejecting an out-of-focus image.

Toric contact lenses are normally prescribed for astigmatic patients with either corneal or lenticular astigmatism, and have a cylindrical optical surface/power which is used to correct for astigmatism in a wearer. Statistically, astigmatism usually occurs in people primarily around either the horizontal axis or the vertical axis, but also at varying axial locations with respect thereto. In the prior art a separate type of toric contact lens is required for each different toric optical power and also for each different orientation of the toric cylindrical axis of the contact lens, which are required to accommodate different patients with differing amounts of astigmatism along different axes.

Accordingly, an inventory of toric contact lenses, or plastic molding parts for molding the toric contact lenses, include a number of different combinations of toric axis location and toric optical power. One significant advantage of the present invention is a resultant substantial reduction in the number of stock keeping units maintained in inventory (different possible prescriptions maintained in inventory).

SUMMARY OF THE INVENTION

Accordingly, it is a primary object of the present invention to provide concentric lens designs for astigmatic presbyopes.

Another object of the present invention is the provision of concentric annular ring lens designs for astigmatic presbyopes which results in a substantial reduction in the number of stock keeping units maintained in inventory.

A further object of the subject invention is the provision of concentric lens designs for astigmatic presbyopes which comprise at least one surface which has a circular central portion and a plurality of concentric annular rings with at least three separate optical powers corresponding to a prescription for a patient and corresponding to 1) a basic distance spherical prescription Rx, 2) a near add spherical prescription Rx, and 3) a spherical prescription corresponding to the full, or preferably a fraction of the, cylindrical prescription Rx.

A presbyope requires a lens with a basic distance spherical prescription for focusing on distant objects and a near spherical prescription (add) for focusing on near objects. In addition thereto, an astigmatic presbyope requires an astigmatic correction, normally in the nature of a cylindrical prescription which specifies both the cylindrical optical power and the orientation of the cylindrical axis. The present invention takes the cylindrical prescription into account in the design of the lens, but does not use a cylindrical optical surface. Instead, the present invention recognizes that the brain can effectively discriminate between separate competing images by accepting an in-focus image and rejecting an out-of-focus image. Accordingly, the present invention provides a portion of the lens with a spherical surface corresponding to the cylindrical prescription, or more preferably a fraction of the full cylindrical prescription, and relies upon the brain to discriminate and accept an in-focus image to compensate for the patient's astigmatism. The spherical surface corresponding to the cylindrical prescription provides a lens with an improved depth-of-field for low cylindrical astigmats.

The present invention is directed to concentric lens designs for astigmatic presbyopes which provide:

(i) the ability to address the visual prescription requirements of approximately 25% of the vision correction market;

(ii) the ability to provide high volume/low cost contact lenses with a minimal number of stock keeping units in inventory, comparable to current spherical contact lenses;

(iii) the ability to eliminate the requirement for cylindrical axis stabilization features for astigmatic patents, thereby providing for greater patient comfort and east of fit; and (iv) the ability to provide lens designs that are finely tunable to the individual needs of a patient.

In accordance with the teachings herein, the present invention provides a multifocus, concentric annular ring lens for astigmatic presbyopes, wherein one of the front and back surfaces of the lens defines a central area comprising a circular disc having a spherical surface corresponding to a basic prescription distance optical power. A plurality of annular rings surround the central area and comprise at least one spherical near optical power annular ring and at least one spherical optical power annular ring which corresponds to the cylindrical optical power prescription of the patient, to provide visual acuity for astigmatic presbyopes.

In greater detail, the spherical optical power annular ring which corresponds to the cylindrical optical power prescription of the patient can correspond to the full cylindrical power prescription or a fraction of the full cylindrical power prescription. The plurality of annular rings also comprise at least one spherical distance optical power annular ring. The plurality of annular rings can comprise alternating spherical near optical power annular rings, spherical distance optical power annular rings, and spherical optical power annular rings which correspond to the cylindrical optical power prescription of the patient. The innermost annular ring is preferably a spherical near optical power annular ring, and the second innermost annular ring can be a spherical optical power annular ring which corresponds to the cylindrical optical power prescription of the patient, and the third innermost annular ring is a spherical distance optical power annular ring. Alternatively, the second innermost annular ring is a spherical distance optical power annular ring, and the third innermost annular ring is a spherical optical power annular ring which corresponds to the cylindrical optical power prescription of the patient. The lens can comprise a contact lens to be worn on the cornea of the eye, such as a soft hydrogel contact lens, or an intraocular lens. For a contact lens, the central area and the plurality of annular rings are preferably formed on the back surface of the lens to minimize flare and glare problems. Moreover, the widths of the individual annular rings can be different to generate a power profile which varies to generate different ratios of distance optical power to cylindrical correction optical power and distance optical power to near optical power.

BRIEF DESCRIPTION OF THE DRAWINGS

The foregoing objects and advantages of the present invention for concentric lens designs for astigmatic presbyopes may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
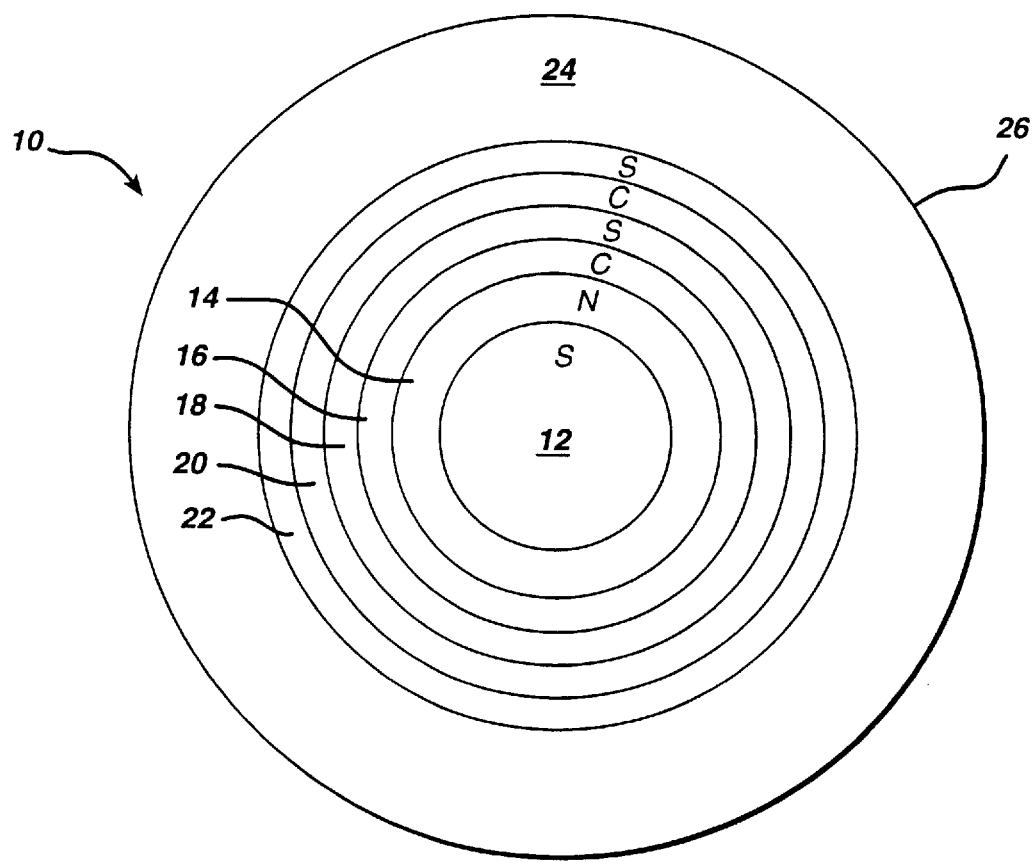
FIG. 1 is a plan view of the back surface of one designed embodiment of a preferred type of contact lens pursuant to the teachings of the present invention which has a central area with a circular disc having a basic prescription Rx spherical distance optical power, surrounded by a plurality of alternating concentric spherical near optical power, concentric spherical distance optical power, and spherical annular rings which correspond to the cylindrical power prescription of the patient.

The present invention provides a lens design for astigmatic presbyopes. A presbyope requires a lens with a basic distance spherical prescription for focusing on distant objects and a near spherical prescription (add) for focusing on near objects. In addition thereto, an astigmatic presbyope requires an astigmatic correction, normally in the nature of a cylindrical prescription which specifies both the cylindrical optical power and the orientation of the cylindrical axis. The present invention takes the cylindrical prescription into account in the design of the lens, but does not use a cylindrical optical surface. Instead, the present invention recognizes that the brain can effectively discriminate between separate competing images by accepting an in-focus image and rejecting an out-of-focus image. Accordingly, the present invention provides a portion of the lens with a spherical surface having the cylindrical optical power prescription, or more preferably a fraction of the full cylindrical prescription, and relies upon the brain to discriminate and accept an in-focus image to compensate for the patient's astigmatism. The spherical surface which corresponds to the cylindrical prescription provides a lens with an improved depth-of-field for low cylindrical astigmats.

Referring to the drawings in detail, FIG. 1 is a plan view of the back surface of one designed embodiment of a preferred type of contact lens 10 pursuant to the teachings of the present invention. The lens 10 has a central area with a circular disc 12 containing a basic prescription Rx spherical distance optical power which is surrounded by a plurality of alternating concentric annular rings 14, 16, 18, 20 and 22. The plurality of alternating concentric annular rings includes a spherical near optical power annular ring 14, spherical distance optical power annular rings 18 and 22, and spherical power annular rings 16 and 20 which correspond to the cylindrical power prescription of the patient. The spherical power which corresponds to the cylindrical power prescription of the patient can be the sum of the basic spherical distance optical power and the cylindrical prescription optical power or the sum of the basic spherical distance optical power and a portion (25% to 100%) of the cylindrical prescription optical power.

Preferably the back surface of the lens is provided with the multiplicity of concentric rings shown in FIG. 1, although the front surface is also suitable, particularly in intraocular lenses.

For example, consider an astigmatic presbyopic patient prescription of: −2.00/−1.00×180 with 1.25 D add. In this prescription, −2.00 diopters is the basic spherical distance prescription Rx, −1.00 diopters is the astigmatic cylindrical optical power prescription Rx correction and 180 specifies a horizontal cylindrical axis, and 1.25 diopters is the near spherical prescription Rx add. In this exemplary embodiment, the powers chosen for the concentric annular rings can be SPHERE (S)=−2.00 D (diopters), CYLINDER (C)=−3.00 D (which is the sum of the spherical distance prescription Rx −2.00 and the cylindrical prescription Rx −1.00) and NEAR (N)=−0.75 D (which is the sum of the spherical distance prescription Rx −2.00 and the near spherical prescription Rx add +1.25).

Some patients may not require the full cylindrical and add powers in these designs. For these cases, the cylindrical and near powers can be made a fraction (preferably 50%) of the full cylinder or add power. The cylindrical power can be the full cylindrical difference or any portion thereof, ranging from 25% to 100% of the full refractive cylindrical power. The specified position for the cylindrical axis is ignored since a spherical surface is substituted therefor. It is not expected that the visual acuity of the patient will deteriorate significantly for low cylindrical astigmats because of the increased depth-of-focus provided by the concentric annular ring designs of the present invention.

Alternately, the near add optical power could be a non-constant function across the concentric annular rings.

The present invention functions by alternating spherical power with cylindrical equivalent spherical power in such a way as to provide adequate levels of images from both optical powers to the retina of the observer.

In general, the powers in the zones may be arranged in a manner determined to be suitable to the visual needs of the patient. Some examples of possible arrangements are shown below, wherein the central disc 12 is listed as the first ring:

| ARRANGEMENT OF RINGS FROM CENTER OF LENS | # RINGS | % OF RINGS FOR | | |
|---|---|---|---|---|
| | | SPHERE | CYLINDER | NEAR |
| SNCS | 4 | 50 | 25 | 25 |
| SNSCS | 5 | 60 | 20 | 20 |
| SNCSCNS | 7 | 43 | 29 | 29 |
| SNSCSNSCSNS | 11 | 55 | 18 | 27 |
| SNCNSNCNSNCNS | 13 | 31 | 23 | 46 |
| SNCNSCSCSNCNS | 13 | 38 | 31 | 31 |

(Where S = SPHERE, C = CYLINDER AND N = NEAR)

In alternative embodiments, the positions of C and N can be reversed, and clearly, many other combinations than those specifically shown are possible.

The combined areas of the center spherical disc 12 and the surrounding annular rings 14 through 22 comprise the active optical area of the lens, which is surrounded by a lenticular (nonoptical) area 24 which is beveled at its outer circumference to an outer circumferential edge 26 of the lens.

The lens can be a contact lens to be worn on the cornea of the eye, such as a soft hydrogel contact lens, or can be an intraocular lens. The central area and the plurality of annular rings are preferably formed on the rear surface of a contact lens to minimize flare and glare problems.

A person's pupil size is a function which is dependent upon light intensity, and is an important parameter in the design of ophthalmic lenses, particularly contact lenses and intraocular lenses.

Moreover, the widths of the individual annular rings can be different to adjust the area of the optic zone devoted to each power, to generate a power profile which varies to generate different ratios of distance optical power to cylindrical correction and distance optical power to near optical power.

Moreover, in order to provide a depth-of-focus effect, asphericity can be incorporated into either of the S, C and/or N rings, or the surface not containing the concentric rings can be made aspherical.

Moreover, ocular in vivo image quality measurement devices can be used to optimize the ocular image quality in the concentric annular ring lens designs to produce even more improved designs. This is accomplished by using an in vivo image quality measurement device to measure and decrease the sum of the aberrations of a first design of a lens on the patient's eye to measure residual aberrations, and then redesigning the lens to reduce the measured residual aberrations and improve visual acuity and performance. The redesign of the lens can include aspherizing the surface opposite the surface defining the central area and the plurality of annular rings, or aspherizing the concentric annular ring surface. An aberroscope or MTF point spread device is preferably utilized to measure the modulation transfer function of the combination of the lens and eye.

Obviously, many different embodiments of the present invention are possible, with alterations of the number of annular rings, the widths and arrangement of the annular rings, and the optical powers assigned to each of the annular rings.

While several embodiments and variations of the present invention for concentric annular ring lens designs for astigmatic presbyopes are described in detail herein, it should be apparent that the disclosure and teachings of the present invention will suggest many alternative designs to those skilled in the art.

What is claimed is:

1. A multifocus, concentric annular ring lens for astigmatic presbyopes, said lens comprising:

a front surface and an opposite back surface, wherein one of the front and back surfaces defines a central area comprising a circular disc having a surface corresponding to a basic prescription distance optical power of an astigmatic presbyope; and a plurality of annular rings surrounding the central area and comprising at least one first annular ring corresponding to a near optical power prescription of the presbyope and at least one circumferentially invariable second annular ring corresponding to a cylindrical optical power prescription of the presbyope, said multifocus concentric annular ring lens eliminating the requirement for cylindrical axis stabilization.

2. A multifocus, concentric annular ring lens for astigmatic presbyopes as claimed in claim 1, wherein the circular disc defines a spheric curve.

3. A multifocus, concentric annular ring lens for astigmatic presbyopes as claimed in claim 2 wherein at least one of the annular rings defines a spheric curve.

4. A multifocus, concentric annular ring lens for astigmatic presbyopes as claimed in claim 1, wherein the circular disc defines an aspheric curve.

5. A multifocus, concentric annular ring lens for astigmatic presbyopes as claimed in claim 4, wherein at least one of the annular rings defines a spheric curve.

6. A multifocus, concentric annular ring lens for astigmatic presbyopes as claimed in claim 3, wherein the second annular ring corresponds to the full cylindrical power prescription.

7. A multifocus, concentric annular ring lens for astigmatic presbyopes as claimed in claim 3, wherein the second annular ring corresponds to a fraction of the full cylindrical power prescription.

8. A multifocus, concentric annular ring lens for astigmatic presbyopes as claimed in claim 3, wherein the plurality of annular rings also comprise at least one third annular ring corresponding to the basic prescription distance optical power of the presbyope.

9. A multifocus, concentric annular ring lens for astigmatic presbyopes as claimed in claim 8, wherein the plurality of annular rings comprise alternating ones of said first, second and third annular rings.

10. A multifocus, concentric annular ring lens for astigmatic presbyopes as claimed in claim 3, wherein the innermost annular ring is one of said first annular rings and the second innermost annular ring is one of said second annular rings.

11. A multifocus, concentric annular ring lens for astigmatic presbyopes as claimed in 10, further comprising at least one third annular ring corresponding to the basic prescription distance optical power of the presbyope wherein the third innermost annular ring is one of said third annular rings.

12. A multifocus, concentric annular ring lens for astigmatic presbyopes as claimed in claim 8, wherein the innermost annular ring is one of said first annular rings and the second innermost annular ring is one of said third annular rings.

13. A multifocus, concentric annular ring lens for astigmatic presbyopes as claimed in claim 12, wherein the third innermost annular ring is one of said second annular rings.

14. A multifocus, concentric annular ring lens for astigmatic presbyopes as claimed in claim 3, wherein the lens comprises a contact lens to be worn on the cornea of the eye.

15. A multifocus, concentric annular ring lens for astigmatic presbyopes as claimed in claim 14, wherein the contact lens comprises a soft hydrogel contact lens.

16. A multifocus, concentric annular ring lens for astigmatic presbyopes as claimed in claim 3, wherein the lens comprises an intraocular lens.

17. A multifocus, concentric annular ring lens for astigmatic presbyopes as claimed in claim 3, wherein the widths of individual annular rings are different to generate a power profile which varies to generate different ratios of distance optical power to cylindrical correction optical power and distance optical power to near optical power.

18. A multifocus, concentric annular ring lens for astigmatic presbyopes as claimed in claim 3, wherein the central area and the plurality of annular rings are formed on the back surface of the lens to minimize flare and glare problems.

19. A method of designing a multifocus, concentric annular ring lens for astigmatic presbyopes comprising the steps of:

selecting a lens comprising a front surface and an opposite back surface, wherein one of the front and back surfaces defines a central area comprising a circular disc having a surface corresponding to a basic prescription distance optical power of an astigmatic presbyope, said lens further comprising a plurality of annular rings surrounding the central area and comprising at least one first annular ring corresponding to a near optical power prescription of the presbyope and at least one circumferentially invariable second annular ring corresponding to a cylindrical optical power prescription of the presbyope, said multifocus concentric annular ring lens eliminating the requirement for cylindrical axis stabilization;

performing an in vivo image quality analysis, of the lens on the eye to measure residual aberrations; and reducing the measured residual aberrations by redesigning the lens to improve visual acuity and performance.

20. A method of designing a multifocus concentric annular ring lens as claimed in claim 19, wherein redesigning the lens includes aspherizing the surface opposite the surface defining the central area and the plurality of annular rings.

* * * * *